April 22, 1930.　　M. M. GOLDBERG　　1,755,504
CASH REGISTER
Filed Jan. 5, 1922　　5 Sheets-Sheet 1

FIG. 1A

Inventor
MAXIMILIAN M. GOLDBERG
By
His Attorneys

April 22, 1930.   M. M. GOLDBERG   1,755,504
CASH REGISTER
Filed Jan. 5, 1922   5 Sheets-Sheet 2

Inventor
MAXIMILIAN M. GOLDBERG

April 22, 1930.  M. M. GOLDBERG  1,755,504

CASH REGISTER

Filed Jan. 5, 1922   5 Sheets-Sheet 4

Inventor
MAXIMILIAN M. GOLDBERG
By Pearl Berst
and Henry E. Stauffer
His Attorneys April 22, 1930.                M. M. GOLDBERG                1,755,504
                                 CASH REGISTER
                               Filed Jan. 5, 1922        5 Sheets-Sheet 5

Patented Apr. 22, 1930

1,755,504

UNITED STATES PATENT OFFICE

MAXIMILIAN M. GOLDBERG, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed January 5, 1922. Serial No. 527,265.

An object of this invention is the provision of mechanism enabling the proprietor of a store selling taxable and non-taxable goods to keep an account of the sale of all goods, and also to keep an account of the tax collected on the taxable goods.

In the accomplishment of this object, mechanism is provided enabling the proprietor to register simultaneously upon separate totalizers, both the amount of the purchase and the proper amount of the tax to be applied thereto.

It is a further object of this invention to provide not only for the registration of the amount of the purchase but also to make a printed record of both the amount of the tax and the amount of the purchase and to indicate the total of said amounts.

As it frequently occurs that the sale of goods, on which no tax is assessed, is to be handled by the same register which handles the sales of taxable goods, the machine is constructed to enable the proprietor to make a record of the sale of the non-taxable goods, and also to indicate the fact that no tax has been registered in connection with the sale.

With these and incidental objects in view, the invention includes certain novel features of construction and combinations of parts, the essential elements of which are set forth in appended claims, and a preferred form or embodiment of which is hereinafter described with reference to the drawings which accompany and form part of the specification.

In general

While the invention is illustrated as carried out in connection with the type of machine shown in Letters Patent of the United States, No. 497,860, issued to Thomas Carney May 23, 1893, and No. 718,565, issued to Jos. P. Cleal, Jan. 13, 1903, it is to be understood that this disclosure is made for illustrative purposes only and that the invention may embrace other types of machines, or be carried out without reference to any special type of machine.

The machine in general includes groups of amount or purchase keys, a key representing a "Tax" transaction, and another key representing a "No sale" transaction. The operation of the machine to register a sale in which there is no tax requires only the depression of the proper "Purchase" keys. The "Tax" totalizer is normally permitted to remain in its disengaged position, so that nothing will be added in the "Tax" totalizer as the "Purchase" keys are depressed.

The operation of the machine to register a sale of taxable goods is effected by depressing first the "Tax" key, and then the keys representing the amount of the purchase, which enters the amount of the sale on the "Purchase" totalizer, and also the amount of the tax on the "Tax" totalizer.

The indicators differ from the usual indicators provided for this type of machine in that they are constructed to indicate, automatically, the amount of the sale plus the tax assessed thereon, when the article sold is taxable. When no tax is collected, however, the indicators will show just the purchase price of the article.

Simultaneously with the registration of the amount of the purchase, this amount is printed on a detail strip in a printing mechanism on the right of the machine. If a tax is collected, the amount thereof is automatically printed in a separate column of the said detail strip opposite the amount of the purchase on which it is collected. If no tax is collected, the tax type-carriers will not be set and will, therefore, print zeros opposite the amount of the purchase.

*Keyboard and driving mechanism*

Described in detail, the machine includes (Figs. 1A and 1B) a series of amount or purchase keys 20, a "No sale" key and a "Tax" key 21. All of the keys 20 are pivotally mounted upon a transverse rod 22 (Figs. 2 and 5), supported in the side frames 23 and 24. Common to all of the keys 20, and resting on the keys near the rear ends thereof is a key coupler 25 supported by trunnions 26 having bearings in the side frames. Each of these keys is provided with a notch 30 adapted to cooperate with the lip 31 on the rear edge of the key coupler.

Figures 5, 6, 7, 11:
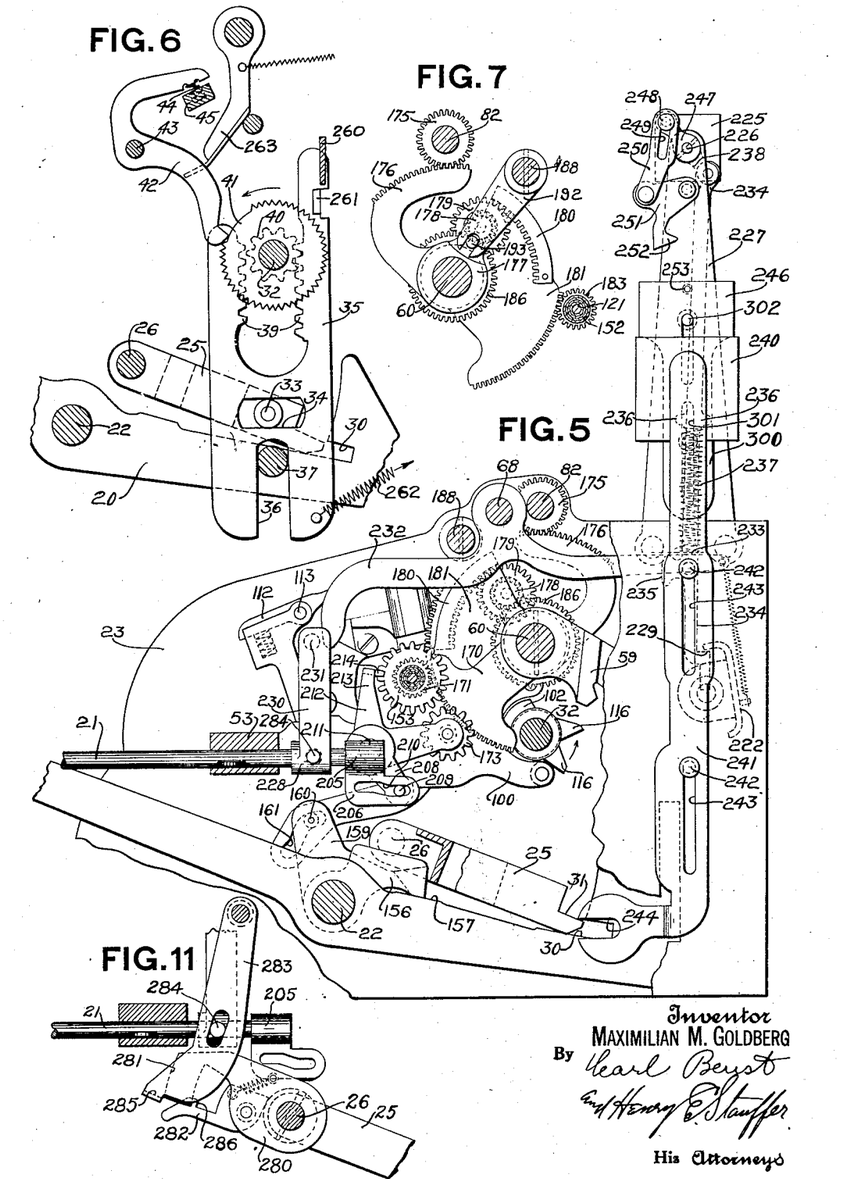
Fig. 5 is a transverse section of the machine taken approximately on the line 5—5 of Fig. 1B.
Fig. 6 is a detail section, partly broken away, of the mechanism for rotating the common operating shaft.
Fig. 7 is a detail section of part of the tax type-wheel mechanism, looking toward the right side of the machine.
Fig. 11 is a side view of the "Tax" key retaining and releasing mechanism.

A rotation shaft 32 supported in the side frames is given a complete rotation upon each reciprocation of the key coupler, by the mechanism shown in Fig. 6. By referring to said figure it will be noted that at its right hand end, the key coupler carries a stud 33, which projects into a slot 34 formed in a vertically reciprocable double rack 35. At its lower end the rack has a notch 36 to straddle a stud 37 on the right hand side frame. At its upper end the rack is provided with oppositely facing rack teeth 39, which cooperate with a pinion 40 fast on the rotation shaft 32. A flange 260 on the side frame cooperates with a flange 261 on the rack to maintain the rack and pinion in mesh. The rack teeth are alternately thrown into and out of mesh with the pinion by a spring 262 and a spring-pressed pawl 263. As is well known in this art, the counter-clockwise movement of the key coupler 25, through the stud 33, raises the double rack 35 and the right-hand teeth 39 turn the pinion and shaft 32 counter-clockwise until the coupler 25 reaches the limit of its counter-clockwise movement. At this point in the operation, the flange 261 has passed upwardly to the left of the flange 260, and as the former leaves the latter, the spring 262, due to the fact that the point of its attachment to the double rack has been moved above the horizontal center of the stud 37, rocks the double rack to move the flange 261 to the right of the flange 260, disengage the right-hand teeth 39 from the pinion 40, and engage the left-hand teeth 39 with said pinion. Now, as the key coupler returns clockwise to its normal position, the left-hand teeth 39 will complete the counter-clockwise rotation of the pinion 40 and shaft 32. This mechanism is substantially the same in construction and operation as the mechanism shown in the before mentioned Carney and Cleal patents.

A ratchet, or full-stroke disk 41, fast to the shaft 32 cooperates with a full-stroke pawl or lever 42, pivoted at 43 to the right hand side frame and held in engagement with the ratchet 41 by a spring 44 seated in a lug 45 on the right hand side frame to prevent retrograde movement of said shaft.

It will thus be seen that upon each complete depression of one of the pivoted keys the key coupler will be reciprocated and through the connections shown in Fig. 6, and just above described, a complete single rotation will be given to the shaft 32. The function of the key coupler, as is well known in the art, is to permit the starting of an operation of two or more keys, for example, the "$1" key and the "20¢" key, and then the completion of the operation by pressing either one of the keys. By reason of the engagement of the lip 31 of the key coupler with the notches 30 in the keys, both the "$1" key and the "20¢" key will be fully operated by the complete depression of either one of the two.

*Totalizers and differential mechanism*

Figure 1A:
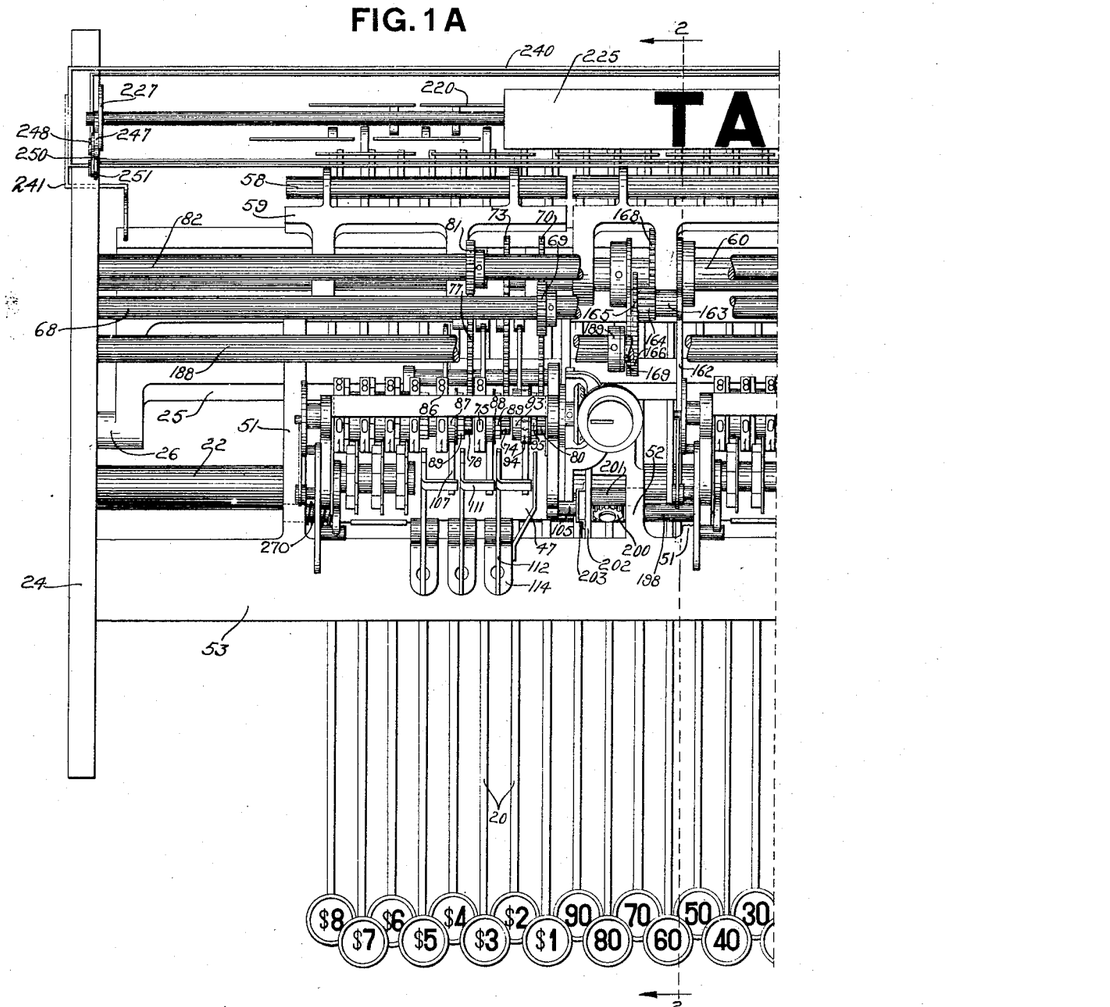
Figs. 1A and 1B taken together constitute a top plan view of the machine with the cabinet and certain parts omitted for the sake of clearness.
Figures 1B, 10:
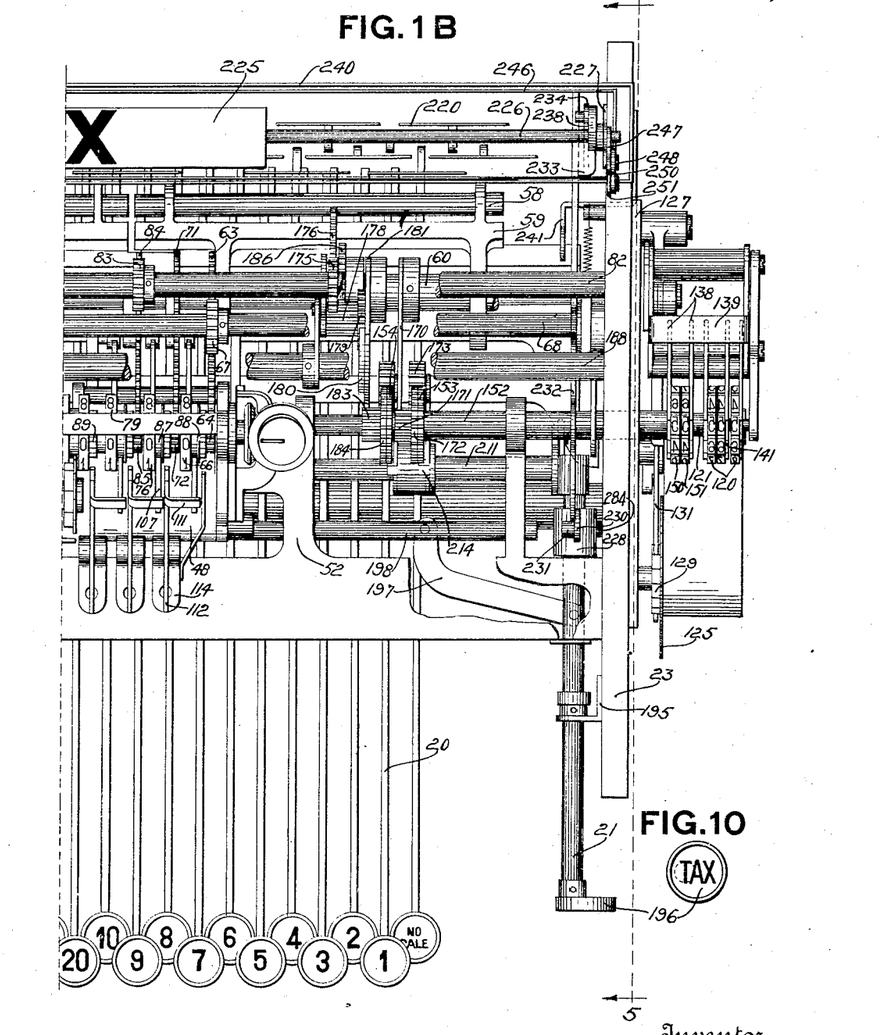
Fig. 10 is an elevation of the "Tax" key.

As hereinbefore stated, the machine is provided with two totalizers 47 and 48 (Figs. 1A and 1B). The two totalizers, as illustrated in the top plan view comprising Figs. 1A and 1B, lie side by side in the machine just above the pivoted keys. The left hand totalizer, for convenience, will be known as the "Tax" totalizer, as there is automatically registered upon this totalizer the proper amount of tax to be assessed upon each entry of the purchase price of an article against which a tax is assessable. The right hand totalizer 48 will be known as the "Purchase" totalizer, as it is upon this totalizer that the amounts of all purchases are registered.

The construction and operation of the two totalizers are identical with the exception of one detail of the "Tax" totalizer, which will be hereinafter pointed out, and for convenience, the "Tax" totalizer will be described in detail. The totalizers are loosely supported on studs 50 (Fig. 2) detachably secured in brackets 51 and 52 carried by a tie-bar 53 extending between the side frames.

Pivotally mounted on each of the keys 20 (Fig. 2) at 57 is an upwardly extending registering segment controller 55 formed near its upper end with a notch 56. These notches are located different distances from the line of pivotal points 57 thereby permitting the registering mechanism of the machine to be operated differentially by the various keys.

Figures 2, 3, 4, 12:
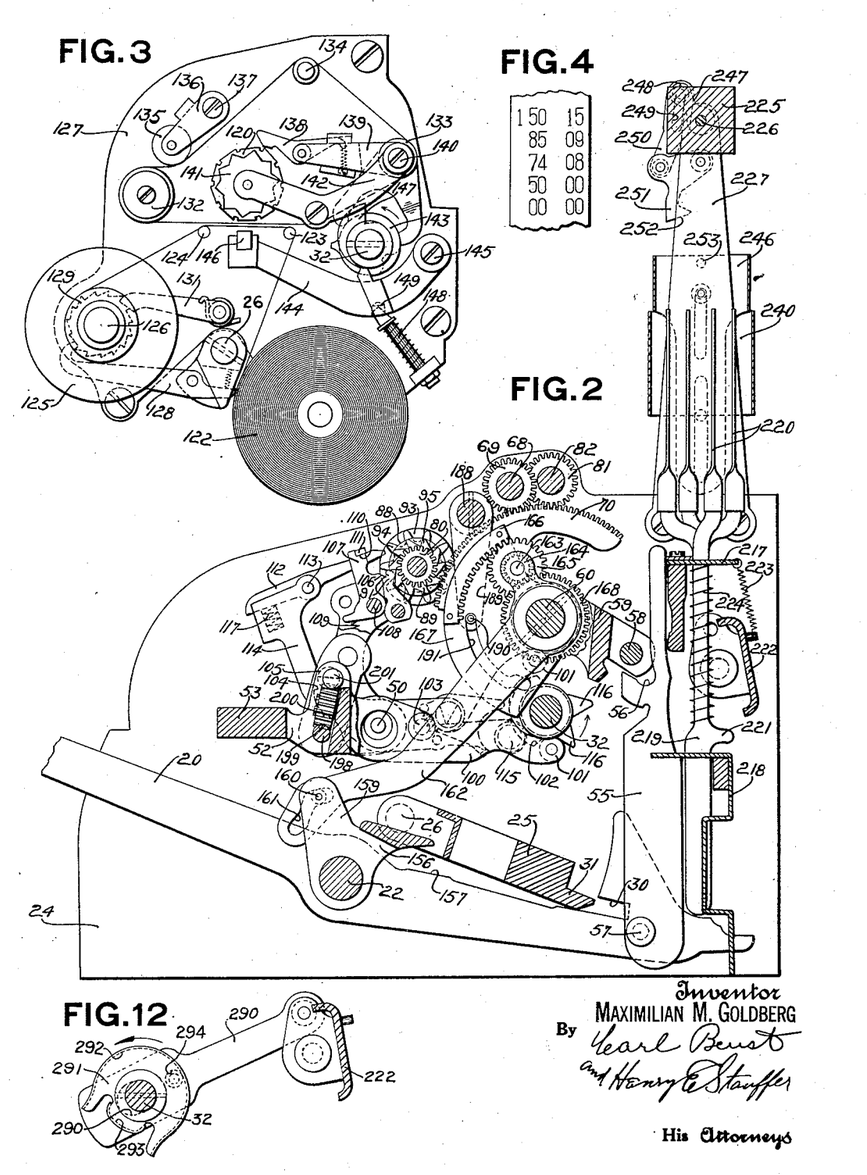
Fig. 2 is a transverse section taken approximately on the line 2—2 of Fig. 1A, looking in the direction of the arrows.
Fig. 3 is an elevation of the printer.
Fig. 4 is a detail view of a fragmentary portion of the detail record strip.
Fig. 12 is a detail view of the actuating means for moving the indicator supporting tail into and out of supporting position.

Referring to Fig. 2, the notch 56 is adapted to engage a cross rod 58 when its corresponding key is depressed. There is a series of cross rods 58 each carried by one of a series of rocking frames 59, supported upon a rock shaft 60 mounted in the side frames of the machine. A frame 59 is provided for each of the groups of amount keys, i. e., one frame for the "Dollars" keys, one frame for the "Tens-of-cents" or "Dimes" keys, and a third frame for the "Units-of-cents" or penny keys. It will thus be seen that when any one of the keys 20 is depressed its appropriate frame 59 will be rocked different distances according to the locations of the notches 56 of their appropriate controllers 55.

Referring to Figs. 1A and 1B, the frame 59 for the "Penny" keys is loosely mounted upon the rock shaft 60 and has fast thereto a registering segment 63. This segment is adapted to be engaged by a pinion 64 fast to the "Penny" totalizer wheel 66 of the "Purchase" totalizer and loosely mounted on a totalizer wheel supporting shaft. The segment 63 also engages with a pinion 67 pinned to a shaft 68 mounted in the side frames. Also fast on this shaft 68 is another pinion 69 which is in engagement with the segment 70. This segment 70 bears the same relation to the "Tax" totalizer as the segment 63 does to the "Purchase" totalizer, as it is adapted to be engaged by a totalizer element driving pinion 80 fast to the "Tax" totalizer element 93. However the element 93 is non-denominational and for this reason is not the penny element of the "Tax" totalizer. It is clear from the above that equal amounts of movement will be given simultaneously to the penny totalizer wheel 66 of the "Purchase" totalizer and to the non-denominational totalizer element 93 of the "Tax" totalizer.

The frame 59 appropriate to the "Dimes" keys is loose on the shaft 60. At its right hand end this frame carries a registering rack segment 71, adapted to be engaged by a pinion 72 loose on the totalizer supporting shaft and fast to the "Dimes" totalizer wheel 76 of the "Purchase" totalizer. The movement of the "Dimes" frame 59 will, therefore, be transmitted to the "Dimes" totalizer wheel 76 of the "Purchase" totalizer by means of the above connections.

Also fast to the left hand end of the frame 59 for the "Dimes" keys is another segment 73 which meshes with the driving pinion 74 for the second wheel 75 from the right which is the units-of-cents wheel in the "Tax" totalizer 47 (Fig. 1A). It is apparent, therefore, that any movement of the frame 59 for the "Dimes" keys will be imparted to the units wheel of the "Tax" totalizer, as well as the "Dimes" wheel in the "Purchase" totalizer.

The frame 59 for the "Dollars" keys is also loosely mounted on the shaft 60 and near its right hand end carries a registering segment 77 adapted to mesh with a driving pinion 78 fast to the third or "Dimes" totalizer wheel 86 in the "Tax" totalizer. This segment also meshes with a pinion 81 fast on a shaft 82 rigidly carrying a pinion 83 in engagement with a segment 84 loosely supported by the shaft 60 and adapted to be engaged by the driving pinion 85 for the "Dollar" totalizer wheel 79 of the "Purchase" totalizer. Through the above connections the movement of the frame for the "Dollars" keys is transmitted to the dollars totalizer wheel of the purchase totalizer and to the dimes wheel of the tax totalizer simultaneously.

It can thus be seen that when one of the "Penny" keys is operated the "Penny" frame 59 will be rocked about the shaft 60 to an extent appropriate to the value of the key depressed. This movement will adjust the segments 63 and 70 according to the value of the key depressed. When a "Dimes" key is depressed the "Dimes" frame 59 will be rocked different distances according to the value of the key depressed, and in view of the connections above described this movement will be transferred to the appropriate segments 71 and 73, for the "Purchase" and "Tax" totalizers respectively. In the event of the depression of a "Dollars" key, the "Dollars" frame 59 will be rocked and will move the appropriate segments 81 and 84, of the totalizers in accordance with the key depressed.

Each of the totalizers, in addition to the totalizer wheels hereinbefore referred to, includes additional wheels to receive the overflow from the wheels receiving entries directly from the actuating segments. Each totalizer also is equipped with the usual turn-to-zero mechanism.

The totalizer wheels of each totalizer bear digits "1" to "9" and "0" except the lower element "93" of the tax totalizer, which functionally merely constitutes a means for causing the transfer arm cooperating with the penny wheel 75 (Fig. 1A), to be tripped during each operation of the machine in which a taxable item involving a number in the unit or penny space is involved.

The readable totalizer wheels directly cooperating with actuating segments are provided with transfer disks 87 carrying a single transfer tooth. Each wheel also carries a spacing disk 88 and a ratchet 89 adapted to cooperate with a spring-pressed pawl 91 (Fig. 2) for the purpose of preventing retrograde movement of the totalizer wheel. The totalizer wheel actuating pinions have been referred to.

The construction and operation of the lower "Tax" element 93 are fully disclosed in a co-pending application of Bernis M. Shipley, Serial No. 294,966, filed May 5, 1919, in which the "Tax" totalizer is claimed. This element 93 carries a transfer disk 94 provided with ten transfer teeth or projections, a ratchet 95, and the actuating pinion 80 which is in alinement with the segment 70 which receives its movement from the "Penny" keys.

When registering a transaction involving the sale of an item which is taxable, the "Purchase" totalizer 48 and the "Tax" totalizer 47 are rocked so as to move the actuating pinions of the various totalizer elements into engagement with their appropriate registering segments. This rocking movement of the totalizers is effected in the following manner. The totalizers, it will be recalled, are pivotally mounted upon brackets carried by the tie bar 53. Pivoted at 103 on the right hand end of each totalizer frame, as shown in Fig. 2, is a lever 100 provided with two arms at its right hand end, each carrying an anti-friction roller 101 cooperating with a cam 102 fast on the rotation shaft 32. The forward end 104 of lever 100 contacts a stud 105 mounted in the totalizer frame. Upon the rotation of the shaft 32 the cam 102 will act upon the lever 100 to rock the totalizers about their pivots and bring the actuating pinions thereof into operative engagement with their appropriate segments.

*Transfer mechanism and auxiliary actuator of tax totalizer*

When a registering element has made a complete rotation and passes from "9" to "0" the projections of the transfer disk 87 appropriate to that totalizer element will engage a point 106 of a tripping pawl 107 pivoted on a rod 108 supported in the totalizer frame. A tripping pawl is provided adjacent the units of cents and tens of cents totalizer elements of the "Tax" totalizer and also adjacent the auxiliary, or non-denominational element 93 of the "Tax" totalizer. The construction of the pawl employed with the element 93 and the parts controlled thereby are identical with like parts of the units and tens of cents totalizer elements. It will be recalled, however, that the readable totalizer elements each carry a transfer disk having but one transfer point or projection, while the auxiliary or non-denominational element 93 carries a disk 94 having ten transfer points or projections thereon.

Each of the tripping pawls is normally held in the position shown in Fig. 2 by a spring 109 so that a notch 110 formed in the upper end of the pawl receives a finger or projection 111 formed on a carrying pawl 112 pivotally mounted at 113 on the upper end of a transfer lever 114. The levers 114 are pivoted in the frame of the totalizer concentric with the pivotal points thereof, and extend rearwardly, and are provided with anti-friction rollers 115 which cooperate with cams 116 fast on the rotation shaft 32. The carrying pawls 112 are normally held in the position shown in Fig. 2 by springs 117 which tend to rock said pawls clockwise, but such rocking of the pawls is normally prevented by the engagement of the projections 111 in the notches 110 in the tripping pawls 107. Upon the rotation of the rotation shaft 32 the cams 116 will engage the anti-friction rollers 115 carried by the transfer levers and rock said levers about their pivotal points.

As the transfer levers 114 are rocked clockwise, as viewed in Fig. 2, the carrying pawls 112 are moved toward the rear of the machine. The free ends of the carrying pawls will be held out of operative engagement with the ratchets 89 of the totalizer wheels of the "Tax" totalizer when the tripping pawls are in the position indicated. If, however, one of the totalizer wheels or the element 93 has been given a movement to cause its projection to engage a corresponding projection on the appropriate tripping pawl 107, said pawl will be rocked counter-clockwise to disengage its notch from the projection 111 on the carrying pawl, whereupon the spring 117 then rocks the carrying pawl clockwise in an effective position whereby it can be moved into engagement with the ratchet 89, and when as the transfer lever 114 is rocked, the carrying pawl 112 will engage the ratchet 89 and move the totalizer element, to which said ratchet is attached, a distance of one step or unit.

On the readable totalizer elements the single projections are located to trip the transfer mechanism as the zeros pass into view at the reading point. It will be remembered that the disk 94 of the auxiliary or non-denominational element 93 of the "Tax" totalizer is provided with ten projections. Let it be assumed that the non-denominational element 93 receives four steps of movement upon depression of the four cent key. When the first projection 94 engages the trip pawl 107 (Fig. 2), the carrying pawl 112 is tripped and it is thereby permitted to move into position for adding one in the penny wheel 75 of the tax totalizer. When the next three projections 94 successively engage the trip pawl 107, the pawl is given three successive idle rocking movements. As a result of this construction the transfer mechanism will be be tripped every time the auxiliary or non-denominational element 93 is given a movement, regardless of the extent of that movement. This will result in permitting the carrying pawl 112 appropriate to the penny totalizer element 75 of the "Tax" totalizer to engage the element 75 and move the same one step, independently of its appropriate segment 73, every time the segment 70 is moved.

If the registration of a purchase involves the operation of any one of the penny keys from "1" to "9", inclusive, the penny totalizer element of the "Purchase" totalizer will be adjusted the proper extent, and simultaneously with this adjustment the auxiliary or non-denominational element 93 of the "Tax" totalizer will be given a movement to a like extent. No matter what the extent of this movement may be, the movement of the auxiliary or non-denominational element 93 will cause a transfer of a unit into the penny totalizer element of the "Tax" totalizer. Consequently upon the registration of every amount involving taxable goods the "Tax" totalizer will be adjusted so that the amount entered thereon will be equal to one cent for each ten cents of purchase and an additional cent for very fraction of ten cents.

It is, of course, to be understood that the pinions of the totalizer elements are in engagement with the segments 63, 71, 84, 70, 73 and 81 as the machine is being operated. As soon as the operating movement of these segments has been completed the cam 102 is then effective to disengage the totalizers from the segments so as to permit the tripped carrying pawls to effect the additional movement above described.

Printing mechanism

For the purpose of printing upon a detail record strip, to be retained within the machine, the amount of the purchase together with the amount of tax assessable thereon, there is provided a printing mechanism attached to the right hand side frame of the machine (see Figs. 1B and 3). The printing mechanism shown in the present application is old and well known in the art. In general it includes a series of type-wheels 120 fast on the right hand ends of a series of nested sleeves 121. The type-wheels are adapted to print the amount of a sale, as shown in the left hand column of figures in the fragmentary portion of the detail strip shown in Fig. 4, and are set by the segments 63, 71 and 84, which, near their lower extremities engage pinions fast on the left hand ends of the sleeves 121. As these segments are being differentially adjusted by the depression of one or more of the amount keys, differential movement thereof will be imparted to the type carriers by means of the before mentioned sleeves and pinions, thereby setting the type wheels 120 differentially to represent whatever amount has been registered in the totalizer. These type carriers are adapted to print on a paper strip carried on a supply roll 122. From the supply roll the strip is led around rollers 123 and 124 to a receiving roll 125, rotatably mounted on a stud 126 projecting from the printer frame 127. The strip is fed in a step-by-step movement by a feeding pawl 128 and a ratchet 129 fast to the receiving roll, the pawl operating the ratchet at each operation of the machine. Retrograde movement of the receiving roll is prevented by the engagement of a pawl 131 with the teeth of the ratchet.

A continuous inking ribbon is supported by the inking rollers 132, 133 and 134 and passes between the type carriers and the detail strip. Tension is maintained on the inking ribbon by means of the idler 135 carried in a yoke 136 pivoted on the rod 137. The printing wheels are alined by a plurality of aliners 138 pivotally mounted in a yoke 139 loose on a rod 140. The aliners cooperate with a series of star-shaped disks 141, one for each printing wheel, to aline and hold the printing wheels in their adjusted positions. A downwardly extending, bifurcated arm 142 fast on one of the arms of the yoke 139 is adapted to engage the periphery of a double plate cam 143 fast on shaft 32. This cam 143 receives one complete rotation upon each operation of the main operating mechanism. This movement will rock the arm 142 counter-clockwise and thereby lower the yoke 139, and engage the aliners 138 with the notches in the disks 141 to hold the disks and their corresponding type carriers in adjusted positions as an impression is made.

A hammer 144 is provided to make an impression on the detail strip from the type carriers 120. The hammer is pivoted at 145 and carries a platen 146 of some suitable material. The hammer has an upwardly extending projection adapted to engage the periphery of a cam 147 mounted on shaft 32. This cam is given one complete rotation upon each operation of the machine and due to its conformation will force the hammer downwardly against a plunger 148 supported by a spring abutting a flange on the upper end of the plunger and a lug projecting from the printer frame 127. The upper end of this plunger is tapered to engage in a depression in the hammer. When the hammer is forced down by the action of the cam the plunger will also be forced downwardly, thereby compressing the spring, and when the high point of the cam passes the upwardly extending projection on the hammer, the hammer is returned to its normal position by the spring-pressed plunger with sufficient force to cause the platen to take an impression from the type-wheels on the detail strip.

Means for positioning the type carriers to print the tax

As can be seen in Fig. 4 not only the amount of the purchase is printed upon the detail strip but also the amount of the tax assessable thereon is also printed, opposite the amount of the purchase. The mechanism whereby the tax type carriers are positioned to print the amount of the tax will now be described. The type carriers 150 and 151 for printing the amount of the tax on the detail strip are shown in Fig. 1B. The units type carrier 150 is fast on the right hand end of a sleeve 152, which at its left hand end has mounted fast thereon a pinion 153. The tens type carrier 151 is mounted on the right hand end of sleeve (not shown) which at its left hand end carries a pinion 154.

Figure 8:
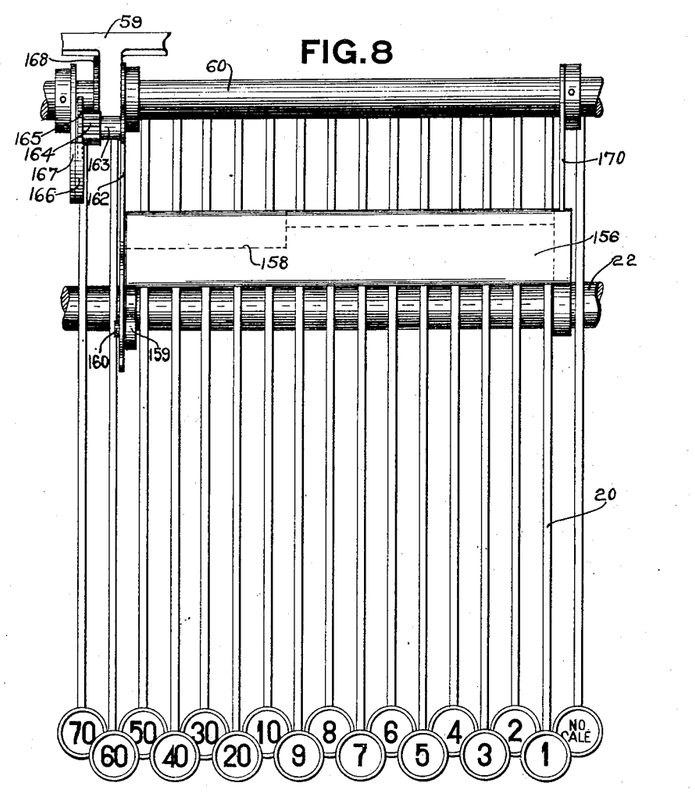
Fig. 8 is a detail plan view of a part of the registering keys, showing the tax type-wheel actuating mechanism operated by the units keys.

Pivotally mounted on the key supporting rod 22 (Fig. 8) and extending crosswise of the machine from the 1 cent key on the right to the left of the 50 cent key on the left of the machine is a bar 156. At its rear end it is adapted to rest on the shoulders 157 of the penny keys. As can be seen with reference to Figs. 2, 5 and 8, the bar 156 will be raised upon every operation of any one of the penny keys. The bar 156 has a notch 158 in Fig. 8 so that the dimes keys will not operate it. At its left hand end, as shown in Figs. 2, 5 and 8, the bar also has an upwardly extending arm 159 carrying a pin 160 projecting through a slot 161 in the lower end of an arm of a bell crank lever 162 loose on the shaft 60. The other arm of this bell crank lever carries a stud 163 constituting a bearing for a broad pinion 164. Fast to the side of this broad pinion is a larger pinion 165 which meshes with a segmental rack 166 carried by a segment 167 pinned to the shaft 60. Fast to the dimes driver frame 59 is a gear 168 which meshes with the broad pinion 164.

When one of the units of cents or penny keys is depressed the bar 156 will be rocked in a counter-clockwise direction (Figs. 2 and 5) about the shaft 22. This rocking movement will be transmitted, by means of the pin 160, to the bell crank lever 162, this lever, however, being rocked in a clockwise direction (Fig. 2). As the frame 59 for the dimes keys is not moved on the depression of one of the units of cents keys, this frame 59, and therefore the gear 168, which meshes with the pinion 164, will remain stationary. When the bell crank lever 162 is rocked clockwise about the shaft 60 the pinion 165 which is fast to the broad pinion 164 carried by the bell crank 162 is moved bodily a distance sufficient to transmit one step of movement to the type carrier 150. It can be seen from Fig. 2 that as the broad pinion 164 is in mesh with the gear 168, which is held stationary, as stated, it will merely roll over the teeth of gear 168 and as the pinion 165 is fast to this broad pinion it will also be rotated a like extent and will rotate the segment 167 one step in clockwise direction (Fig. 2). As this segment is fast on shaft 60 this one step of movement will be communicated to another segment 170 (Fig. 5), also fast on shaft 60 (Figs. 1B and 5.) This segment 170 has a rack meshing with a broad pinion 171, to the right hand side of which is secured a pinion 172 which is a companion pinion to the pinion 153 fast to sleeve 152, on which the units type carrier 150 is mounted. The companion pinions 153 and 172 are adapted, during operations in which it is desired to print a tax, to be coupled together by means to be described later, so that the one step of movement imparted to the segment 167 by the operation of any of the penny keys "1" to "9" inclusive will be transmitted by means of the shaft 60, segment 170, broad pinion 171, pinion 172, coupling pinion 173, pinion 153 and one of the sleeves 152 to the units type carrier 150 and will thereby set up "1" thereon.

The type carrier 150 will also be turned one unit for every ten units registered by the dimes keys by some of the mechanism just described. As can be seen in Fig. 2, whenever one of the dimes keys is depressed the frame 59 for the dimes keys is rocked about the shaft 60 in a counter-clockwise direction a distance proportionate to the value of the key depressed, carrying with it the gear 168 which rotates the broad pinion 164 and the pinion 165 secured thereto in a clockwise direction. This movement of the pinion 165 drives the rack 166, segment 167, shaft 60 and the segment 170 (Fig. 5) clockwise and the pinion 171 counter-clockwise. The pinion 172 fast to the pinion 171 will be rotated counter-clockwise, and through the coupling pinion 173, pinion 153, and sleeve 152 rotate the units type carrier 150 a distance proportionate to the value of the key depressed. It is apparent, therefore, that the differential movement imparted to the frame 59 by one of the dimes keys will be transmitted to the units type carrier 150 of the tax type carriers to adjust the same to a position corresponding to the value of the dimes key depressed.

When it is desired to register 15¢ and set it up on the tax type carriers the 10 cent and the 5 cent keys are depressed simultaneously. Through the connections described above, it is apparent that the 10 cent key and the 5 cent key will each move the units type carrier 150 one space simultaneously, to a combined movement of two spaces.

This operation will be the same no matter what combination of pennies and dimes keys is depressed, i. e., the dimes keys will cause the units type carrier 150 to be positioned directly proportionate to the value of the keys depressed, while each and every one of the penny keys depressed will add one additional unit to the amount set up by the dimes keys.

When one of the dollars keys is depressed, it is desired that the tens type carrier 151 of the tax type carriers be adjusted. It will be remembered that when one of the dollars keys is depressed the frame 59 therefor will be rocked and with it the segment 77 fast thereto. This segment 77, through the pinion 81, shaft 82, and a pinion 175 rotates a segment 176 rotatably mounted on the shaft 60. Rotatably mounted on the shaft 60 adjacent to the segment 176 is an arm 177 which carries a broad pinion 178 fast to the right hand side of which, as seen in Fig. 1B, is another pinion 179, which meshes with a rack 180 (Fig. 7) carried by a segment 181 loose on the shaft 60. This segment 181 meshes with a pinion 183 loose on one of the sleeves 152 and carrying a pinion 184 adapted to be coupled to its companion pinion 154, fast on the left hand end of the sleeve, on the right hand end of which is the tens type carrier 151 of the tax type carriers. Also mounted on the shaft 60 fast to the segment 176 is a gear 186 which meshes with the pinion 178 carried by the arm 177. The arm 177 is held against rotation for all taxable purchases except amounts from 91¢ to 99¢, both inclusive, by an arm 192, later described. It can be seen, therefore, that when one of the dollars keys is depressed the differential movement of the frame 59 for the dollars keys will be transferred by the segment 77, pinion 81, pinion 175 and segment 176 to the gear 186 to rotate the gear 186 clockwise, as viewed in Fig. 7, and rotate the pinions 178 and 179 in counterclockwise direction to drive the rack 180 and segment 181 counter-clockwise (Fig. 7). The movement of the segment 181 will be transferred to the pinion 183 and through the companion pinions 184 and 154, which are adapted to be coupled during certain operations of the machine and one of the sleeves 152, to the tens type carrier 151.

It will be noted that if any amount from 91 to 99 cents, inclusive, is registered on the machine the units type carrier 150 of the tax type carriers will be moved 9 spaces by the operation of the 90¢ key and one space to its zero position by the operation of any one of the keys from 1 to 9, inclusive. For this reason a mechanism is provided which will, upon the operation of any of the keys from 91 to 99, inclusive, move the tens type carrier 151 one space, thereby setting up the figure "1" on said type carrier 151 so that, together the tax type carriers are set to "10," this being the proper amount of tax for any of the above combinations.

Pinned to a shaft 188 rotatably mounted in the side frames of the machine is an arm 189 which at its lower end (Fig. 2) carries a roller 190 cooperating with a slot 191 in the segment 167. When the 90¢ key is depressed the arm 189 will not be rocked during the first nine steps which are given the segment 167 as the slot is concentric with the shaft 60 for nine-tenths of its length. When, however, any one of the keys representing amounts from 91¢ to 99¢, inclusive, is depressed the segment 167 will be moved ten steps, and when the segment moves from its ninth to its tenth position the conformation of the slot 191 rocks the arm 189 counterclockwise (Fig. 2) and the shaft 188 clockwise, as viewed in Fig. 7. Also pinned to this shaft 188 is another arm 192 (Fig. 7) bifurcated to straddle a pin 193 mounted on the arm 177. As above described, this arm 177 carries gears through which differential movement is transmitted to set up the tens type carrier 151 of the tax type carriers when one of the dollars keys is depressed. As no dollar key is depressed during the operation under consideration the segment 176 and the gear 186 remain stationary, but as the shaft 188 is rocked by the means just previously described, the arm 192, through the stud 193 on the arm 177, will rock this arm 177 counter-clockwise, as viewed in Fig. 7 and as the gear 186 is held against rotation the pinions 178 and 179 roll over said gear and move the rack 180 and the segment 181 one step, and through the gears 183, 184, 154 and sleeve 152, tens type carrier and adjust the tens type carrier 151 to a position in which the figure "1" will be on the printing line. It can be seen, then, that when keys involving amounts from 91¢ to 99¢ inclusive are depressed, "10" will be set up on the tax type carriers 150 and 151, this amount being the proper amount of tax assessable on a purchase of such value.

*Tax key*

In the normal positions of the parts, as shown in Figs. 1A and 1B, the machine is not in condition to register or print the amount of a tax. The totalizers are normally disengaged from their actuating segments and the throwout lever 100 for the "Tax" totalizer is normally rendered ineffective to move the same into engagement with its actuating segments.

When a taxable article is sold, and it is desired to register the amount of the tax in the machine a mechanism is provided which renders the tax totalizer, the tax type carriers and the tax indicators effective. This mechanism will now be described.

Just inside of the right hand side frame is a key 21 which is in the form of a rod slidably mounted in the tie-bar 53 and a bracket 195 carried by the side frame. This rod on its forward end has a finger button 196 upon which is the word "Tax" to denote the character of this key. Pivoted on the under side of this rod 21 is a link 197 pivoted to a rod 198 slidably mounted in the counter-supporting brackets 51 and 52 and adapted to be slid crosswise of the machine when the tax key 21 is pressed in (see Fig. 1B). A spring 270 (Fig. 1A) bearing against the bracket 51 and a collar on the rod 198 is of sufficient strength to return the "Tax" key to, and normally hold it in, its outer position. This rod 198 is provided, in its upper side, with a series of teeth 199 (Fig. 2) which mesh with a pinion 200. Directly above this pinion and having teeth formed in its lower side which mesh with pinion 200 is a short rod 201 mounted in the counter-supporting bracket 52. To the left hand end of this rod 201 is fastened a plate 202 which carries a projection 203 adapted to engage a stud 105 spring-pressed toward the right, as shown in Fig. 1A.

It will be remembered that the totalizer is rocked into engagement with its actuating segments by means of the arm 100 whose forward end 104 contacts the spring-pressed stud 105 and rocks the totalizer in a clockwise direction about the studs 50. The stud 105 has, however, a notch, which, in the present instance, is normally in the path of the lever 100 so that when the lever is actuated to rock the totalizer into engagement with its actuating segments it will enter the notch of the stud 105 and have no effect upon the totalizer. When, however, it is desired to register a tax and rock the totalizer into engagement with its actuating segments the tax key 21 is pressed inwardly to move the notch of the stud 105 out of alinement with the lever 100 to permit the lever to communicate its movement to the totalizer.

The above described mechanism is old and well known in the art, and if any further description of the same is desired reference may be had to the aforementioned Carney and Cleal patents.

Mechanism is provided, as shown in Fig. 11, to retain the "Tax" key, when pushed in, in its tax registering position until the end of the operation of the machine. A retaining arm 280 (Fig. 11) provided with a hub pinned to the right hand key coupler trunnion is provided with a foot 281. A spring drawn retaining pawl 282 is pivoted to the arm 280, and its movement under the influence of the spring is limited by contact with the hub of said arm. An arm 283 pivoted to the side frame is slotted to receive a stud 284 carried by the "Tax" key 21. When the "Tax" key is moved inwardly, it rocks the arm 283 counter-clockwise and a flange 285 on the arm 283 strikes and swings the pawl 282 until said flange passes a shoulder 286 on said pawl. A spring connected to the arm 280 and pawl 282 (Fig. 11) then snaps the pawl 282 clockwise, whereupon the arm 283 is held in its moved position, thus retaining the depressed "Tax" key 21 in its depressed position. Now, as the key coupler 25 rocks counter-clockwise, the retaining arm 280 is rocked likewise, and the retaining pawl 282 moved bodily downwardly away from the flange 285 of the arm 283. When the flange 285 is released from the pawl 286 of the retaining pawl 282, the arm 283 is rocked clockwise by the "Tax" key restoring spring 270 (Fig. 1A) until the flange 285 (Fig. 11) contacts the right-hand or rear edge of the foot 281 of the retaining arm 280. As the arm 280 continues its counter-clockwise movement, the flange 285 slides along the rear edge of the foot 281. When the key coupler 25 rocks clockwise to its normal position, the retaining arm 280 is rocked clockwise and moves the retaining pawl 282 bodily upwardly and said pawl strikes the flange 285 of the arm 283, and the latch pawl 282 is rocked counter-clockwise about its pivot until the foot 281 of the retaining arm 280 has been raised above the flange 285. At this point in the operation, the flange 285 is no longer restrained by either the retaining arm foot 281 or the retaining pawl 282, and the "Tax" key restoring spring 270 restores the "Tax" key 21 to its normal position, thus returning the arm 283 to its normal position.

The tax key 21 also controls the printing of the tax on the detail strip. In the normal positions of the parts, as shown in Fig. 5, the tax type carriers will be locked in their zero positions. When, however, the tax key is pressed in, thereby permitting registration of the amount of the tax in the tax totalizer, the amount of the tax will also be printed on the detail strip to the right of the amount of the purchase, as indicated in Fig. 4. Fast on the rear end of the rod 21 of the tax key is a cap 205 which has an arm 206 provided with a slot 208 into which projects a pin 209 fast in the lower end of an arm 210 pinned to a shaft 211. Also fast on this shaft is a two-armed lever 212. An upwardly extending arm 213 of this two-armed lever carries at its upper end a projection 214 normally in engagement with the teeth of the pinion 153 (Figs. 1, 3 and 5). When the Tax key is in its outer or "No tax" position, the arm 213 of the two-armed lever 212 is in the position shown in Fig. 5, and thereby locks the pinion 153, sleeve 152 and units tax type carrier 150 in their zero positions.

When, however, the tax key is pressed in, the slot 208 in the arm 206 of the cap 205 carried by the rod 21 will, through the cooperation of the pin 209 and lever 210, rock the shaft 211 in counter-clockwise direction (Fig. 5) and move a coupling pinion 173, carried by the other arm of the two-armed lever 212, into engagement with both of the companion pinions 153 and 172, thereby transmitting the movement of pinion 172 to the pinion 153, one of the sleeves 152 and the tax type carrier 150. At the time the coupling pinion 173 is being engaged with the companion pinions 153 and 172 the locking nose 214 carried by the arm 213 of the two-armed lever 212 will be withdrawn from its locking engagement with the teeth of the pinion 153 and thereby permit the operation of this pinion with its corresponding sleeve 152 and type carrier 150. The above described mechanism is the one used in connection with the segment 170 (Fig. 1) for setting up the units tax type carrier. A locking and coupling mechanism is also provided for the segment 181 for the tens tax type carrier, but as it is the exact duplicate of the mechanism just described no further description of the same will be given herein.

Indicating mechanism

Indicating mechanism is provided for the purpose of indicating the amount of the sale, when no tax is assessed thereon and to indicate the total amount of the sale plus the amount of the tax, when the article sold is taxable. The mechanism for operating the indicators and exposing the appropriate figures with relation to the character of the sale will now be described.

Figure 9:
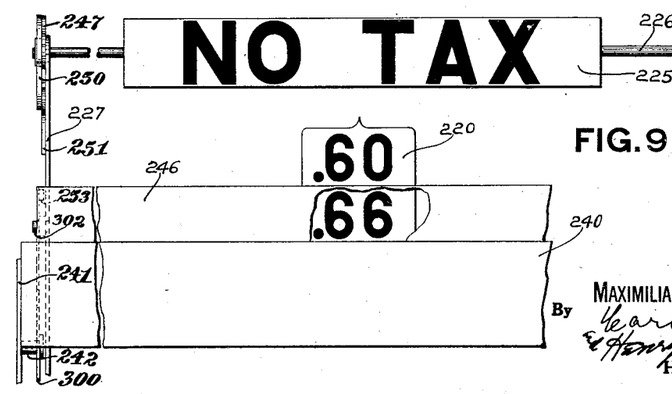
Fig. 9 is a detail view of the indicating mechanism.

Slidably mounted in the guides 217 and 218 (Fig. 2) just above the rear end of each of the keys 20 is an indicator rod 219 which carries at its top one of a series of indicating tablets 220 of a type fully described in the hereinbefore mentioned Carney and Cleal patents. The indicator rods are yieldingly held in their lowermost positions by springs 224 so that their lower ends are in contact with the rear ends of the keys 20. Each of the indicator tablets 220 bears a special character or characters preferably identical with the character or characters appearing on the forward ends of their appropriate keys, as well as a character or characters representing the amount represented by that particular key plus the appropriate amount of the tax therefor. In Fig. 9 the indicator for the key representing 60 cents is shown. The amount "60¢" is on the upper portion of the indicator tablet while on the lower portion thereof is the amount "66¢", this being the previously mentioned amount of "60¢" plus the tax of "6¢". Mechanism, which will be described later, is provided to conceal from view either one of the two amounts, depending upon whether the sale registered has been of a taxable or non-taxable article.

It is apparent that the indicator rods 219 will be raised upon depression of their respective keys 20. Each rod is provided with a shoulder 221 adapted to cooperate with a retaining bail 222 which is moved first clockwise as the shoulder is brought toward it to permit the same to pass and to release the indicator rods elevated during the previous operation, and then counter-clockwise under said shoulder to support said rods in elevated position. As shown in Fig. 12 this movement is given to the retaining bail 222 by a pitman 290 connected thereto at one end and provided at its other with a slot through which the shaft 32 extends. The pitman carries a roller 294 which cooperates with cam flanges 292 and 293 on a disk 291 fast on the shaft 32. Springs 223 may be employed to hold the cooperating parts on the pitman, shaft and cam in their proper positions.

"Tax" and "No tax" indicators

An indicator 225 (Figs. 2 and 9) is provided for indicating to the purchaser whether or not a tax has been registered in the machine. This indicator is fast on a shaft 226 rotatably mounted in brackets 227 supported by the side frames of the machine, and is of the block type and on two of its opposite faces carries the word "Tax" while on the remaining two opposite faces are the words "No tax". It will be remembered that the machine, with the parts in their normal positions, is adapted to register and indicate a transaction in which no tax is assessable, and therefore in the normal positions of the parts the words "No tax" as shown in Fig. 9 will be exposed. When, however, it is desired to register an article on which a tax is assessable the operation of the "Tax" key 21 will position this indicator to expose the word "Tax". The mechanism whereby the "Tax" key positions the indicator 225 in either its "Tax" or "No tax" positions will now be described.

Fast on the rod 21 (Fig. 5), of the "Tax" key is a sleeve 228 provided with an upwardly extending arm 230 carrying a pin 231 adapted to engage the forwardly extending arm of a two-armed lever 232 pivotally mounted on the shaft 68. The rearwardly extending arm of this lever, near its rear end, is bent to form a flange 233 slotted to receive the lower end of a link 234. This link has a lug 235 located below and in engagement with the underside of the flange 233. The link is also provided with a pair of lugs 236 and between these lugs 236 and the flange 233 is a spring 237 coiled about the link 234. When it is desired to expose the "Tax" indicator to view the "Tax" key is pressed inwardly, whereupon the pin 231 rocks the two-armed lever 232 counter-clockwise raising its rear end and the flange 233 thereby compressing the spring 237.

The link 234 is pivoted at its upper end to a short arm 238 fast on the shaft 226, supporting the indicator 225. At its extreme lower end the link is bent to form a shoulder 229 the top edge of which normally engages the under side of the upper flange of the retaining bail 222. The link 234 is therefore locked in its lower position until the bail 222 is rocked by the action of the cam 291 as a registration is effected, whereupon the spring 237 will move the link 234 upwardly until the bottom of the bent section of the link 234 is above the retaining bail 222. The bail springs 223 (Fig. 2) then move the upper flange of the bail 222 beneath the bent section of the link 234, thus retaining the link in its upper position. The upward movement of the link rocks the shaft 226 and indicator 225 in counter-clockwise direction, as seen in Fig. 5, ninety degrees, thereby exposing the faces carrying the word "Tax". Near the end of the operation of the machine, the "Tax" key is restored to its normal position by its restoring spring 270, as previously pointed out. The link 234, however, is retained in its upper position by the bail 222, thus leaving the "Tax" exposed to public view until the machine is again operated.

Assuming, that it is now desired to register a sale of non-taxable goods. The "Tax" key is left in its normal outer position. The movement of the "Tax" key to normal position during the previous "Tax" registering operation removes the pin 231 from engagement with the forwardly extending arm of two-armed lever 232. Now, during the instant "No tax" registering operation, the regular amount keys only are operated, and when the retaining bail 222 is rocked clockwise, by the pitman 290 (Fig. 12), a spring (Fig. 5) attached to the bail 222 and the rear arm of the two-armed lever 232, restores the lever 232 to its normal position and the flange 233 thereon, by its contact with the lug 235 of the link 234, moves said link downwardly to its normal position, thus rocking the arm 238, shaft 226, and indicator block 225 clockwise to conceal the indicia "Tax", and expose the indicia "No tax."

The machine is provided with a shield 240 (Figs 1A, 1B, 2, 5 and 9) for the purpose of concealing the indicators from view while the proper one is being brought to its exposed position. This shield is carried by a pair of lifting links 241 (Fig. 5) guided on studs 242 mounted in the side frames of the machine and projecting through slots 243 in said links. At their lower ends these links are bent and have open slots 244 into which the lip 31 of the key coupler projects and lowers to raise and lower the lifting links 241. When any one of the keys 20 is depressed, and the key coupler raised thereby, the links 241 move the shield 240 to a position to conceal the indicator tablets. At the end of the operation, when the keys are restored to their normal positions, the shield 240 will again be brought to its normal position by the lowering of the key coupler.

An auxiliary shield 246, carried by the shield 240, is provided for normally concealing the lower set of figures on the indicator tablets from view (see Fig. 9). The shield 246 is provided with two legs 300 slotted at 301 to cooperate with studs carried by the lifting links 241. Studs 302 on the brackets 227 cooperate with slots in the shield 246 to limit the movements of said shield. It will be recalled that the lower set of figures carried by the indicator tablets represents the amount of the sale plus the amount of tax assessable thereon, and therefore when a sale is made on which no tax is assessable, it is not desired that these figures be exposed. However, when a taxable sale is made, it is desired to indicate the total amount of the purchase price plus the tax. Therefore, means is provided for causing the auxiliary shield 246 to be latched in its upper position, and when the shield 240 is lowered, the auxiliary shield 246 will still conceal the upper set of figures on the indicator tablets and expose to view the lower set. The mechanism for accomplishing this will now be described. Fast on each end of the shaft 226 carrying the "Tax" and "No tax" indicators is a short arm 247, (Figs. 1 and 5) carrying a pin 248, projecting through a slot 249 in a link 250. These links at their lower ends are pivotally connected to a pair of latches 251, which in turn are pivotally supported by the pair of brackets 227.

It will be remembered that when the "Tax" key 21 is pressed in, the link 234 is raised by the spring 237 and the shaft 226 rocked counter-clockwise (Fig. 5) by the arm 238. As the arms 247 are fast to the shaft 226 the links 250 rock the latches 251 about their pivots a sufficient distance to bring the hooks 252 thereof into the path of pins 253 projecting from the ends of the auxiliary shield 246. It can therefore be seen that, when the shield 240 carrying the auxiliary shield 246 is raised on a tax operation of the machine, the pins 253 will strike the lower faces of the hooks 252 of the latches 251, and as these latches are yieldingly held in their latching positions by the springs 237 the pins will rock them clockwise about their pivots a sufficient distance to permit the pins to pass the ends of the hooks 252 thereof. When the pins have passed the hooks the springs 237 will cause the latches to resume the positions to which they were moved by the operation of the tax key, and said latches 251 will hold the auxiliary shield 246 in its upper position in order to expose to view the lower set of figures on the indicator tablets representing the amount of the sale plus the amount of the tax.

The "No sale" key hereinbefore referred to is similar in construction and operation to that of the amount keys except that it is not provided with a cam to operate the totalizers. Its operation causes the release of previously elevated indicator tablets, the exposure of a "No sale" indicator tablet, and impressions of zeros in the tax and purchase columns on the detail strip.

Operation

The "Tax" key is normally in its outer position and the machine is in condition to register the value of non-taxable goods in the usual manner.

When it is desired to register the value of taxable goods, together with the tax thereon, the "Tax" key is pushed in to prepare the machine for such registration. As the key is pushed in, the stud on the "Tax" totalizer is shifted to permit the throw lever to cooperate therewith to rock the "Tax" totalizer into engagement with its actuating segments, the actuating segments are operatively connected with the "Tax" type-wheels, and a condition is set up which, upon operation of the machine, will effect an operation of the block indicator 225 and control the upper shield 246 to expose the proper characters on the indicator tablets 220.

Operation of the machine releases the "Tax" key, which is returned to normal by a spring 270 and prepares the machine for registering the value of non-taxable goods upon the succeeding operation, by an operation of the amount keys in the usual manner.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a type carrier, a plurality of groups of keys for adjusting the type carrier common thereto, means whereby each operation of each key of one group effects the same adjustment of the type carrier as every other key in the same group, and means whereby the operation of the keys of the other group effects a differential adjustment of said type carrier.

2. In a machine of the class described, groups of manipulative amount determining means, the individual members of each group corresponding respectively with the basic digits of a monetary system, an adjustable recording element under control of a plurality of said groups, means under control of one of said groups for adjusting said recording element differentially, and means under control of another of said groups for giving said recording element an invariable extent of adjustment upon every operation of any one of the amount determining means of said latter group.

3. In a machine of the class described, the combination of an adjustable recording element, a plurality of groups of keys, the individual members of each group corresponding respectively with the basic digits of a monetary system, means under control of one of said groups for adjusting said recording element differentially, and means operable directly by any key of another group for adjusting said element invariable extents at each operation of any key of the last-named group.

4. In a machine of the class described, the combination of a plurality of pivoted key levers arranged in denominational groups, a recording element adapted to be operated by said key levers, and means resting on and common to one group of said key levers for adjusting said element invariable extents.

5. In a machine of the class described, the combination of a plurality of pivoted key levers arranged in denominational groups, a recording element adapted to be operated by said key levers, and a pivoted yoke member resting on one denominational group of key levers and operatively connected to said recording element to adjust the same.

6. In a machine of the class described, the combination of a plurality of pivoted key levers arranged in denominational groups, a recording element, a pivoted yoke member common to one denominational group of said key levers and adapted to be given an invariable movement upon operation of said group of key levers, and means operatively connecting said yoke and recording element to adjust the latter the same extent upon operation of any key in said group.

7. In a machine of the class described, the combination of a plurality of pivoted key levers arranged in denominational groups, a recording element adapted to be operated by said key levers, means operated by one denominational group of key levers for adjusting said recording element variable extents, and means resting on and common to another denominational group of key levers for adjusting said recording element invariable extents.

8. In a machine of the class described, the combination of a plurality of pivoted key levers arranged in denominational groups, a recording element adapted to be operated by said key levers, means operated by one denominational group of key levers for adjusting said recording element variable extents, and means resting on and common to another denominational group of key levers for adjusting said recording element an additional invariable extent when keys of both groups of key levers are operated.

9. In a machine of the class described, the combination of two sets of recording elements, differential mechanism for adjusting both sets of recording elements differentially, manipulative amount determining means for controlling said differential mechanism, and means controlled by certain of said amount determining means at every operation thereof, for adjusting one of said recording elements invariable extents.

10. In a machine of the class described, the combination of a plurality of groups of manipulative amount determining devices, an adjustable recording element, a connection between said element and one of said groups involving a rotatable and bodily shiftable gear adapted to be rotated by any of the amount determining devices of one group to adjust the recording element differentially, and means under the control of another group of amount determining devices to shift said gear bodily transversely of its axis to further adjust said recording element.

11. In a machine of the class described, the combination of a plurality of groups of amount determining devices, an adjustable recording element, a connection between said element and one of said groups involving a rotatable and bodily shiftable intermediate gear, means controlled by said group for directly rotating said gear to adjust said recording element, and means under control of another group to shift said gear bodily transversely of its axis to adjust said recording element at every operation of any amount determining device in the last-named group.

12. In a machine of the class described, the combination of a plurality of groups of amount determining press-down keys for driving the machine, an adjustable recording element, a connection between said keys and element involving a rotatable gear mounted for bodily movement, means operated by one group of keys for directly rotating said gear, and means operated by another group for rotating said gear by moving it bodily transversely of its axis at each operation of any device in the last-named group of amount-determining devices.

13. In a machine of the class described, the combination of manipulative amount determining devices, a recording element, means involving concentric racks, and a connecting gear mounted for bodily movement, a connection between the recording element and the last-named means; means under control of certain of said amount determining devices to rock one of said concentric racks, and means under control of other manipulative amount determining devices to shift said gear bodily at each operation of any of the last-named amount determining devices.

14. In a machine of the class described, the combination of a plurality of groups of type carriers, key-operated means for adjusting individual members in each of said groups of type carriers, to different extents, simultaneously and proportionally to each other, and means to disable the connections between said key-operated means and one of said groups of type carriers.

15. In a machine of the class described, the combination with a type carrier; of a plurality of groups of keys, any key in one of which groups is operable simultaneously with any key in another of said groups to adjust the type carrier common to all the groups; means to cause each key of one group to always effect the same adjustment of the type carrier as every other key in the same group; and means to enable the keys of another group to effect a differential adjustment of the type carrier supplemental to the invariable adjustment imparted by the keys of the first-named group.

16. In a printing device, the combination with a plurality of denominational printing elements; and a plurality of denominational banks of keys associated with the corresponding denominational printing elements; of an actuator for the units denominational printing element operable at each operation of any of the keys in the corresponding denominational bank, to advance the units printing element one step only irrespective of which key in the denominational bank is operated; and a second actuator for the units printing element, operable by any key of another denominational bank to advance the units printing element differentially during the same operation on which the first-named bank advances the units element a single step.

In testimony whereof I affix my signature.

MAXIMILIAN M. GOLDBERG.